Dec. 6, 1927.  
A. R. CLAS  
1,651,870  
WINDOW REGULATING MECHANISM  
Filed Oct. 22, 1924  
4 Sheets-Sheet 3
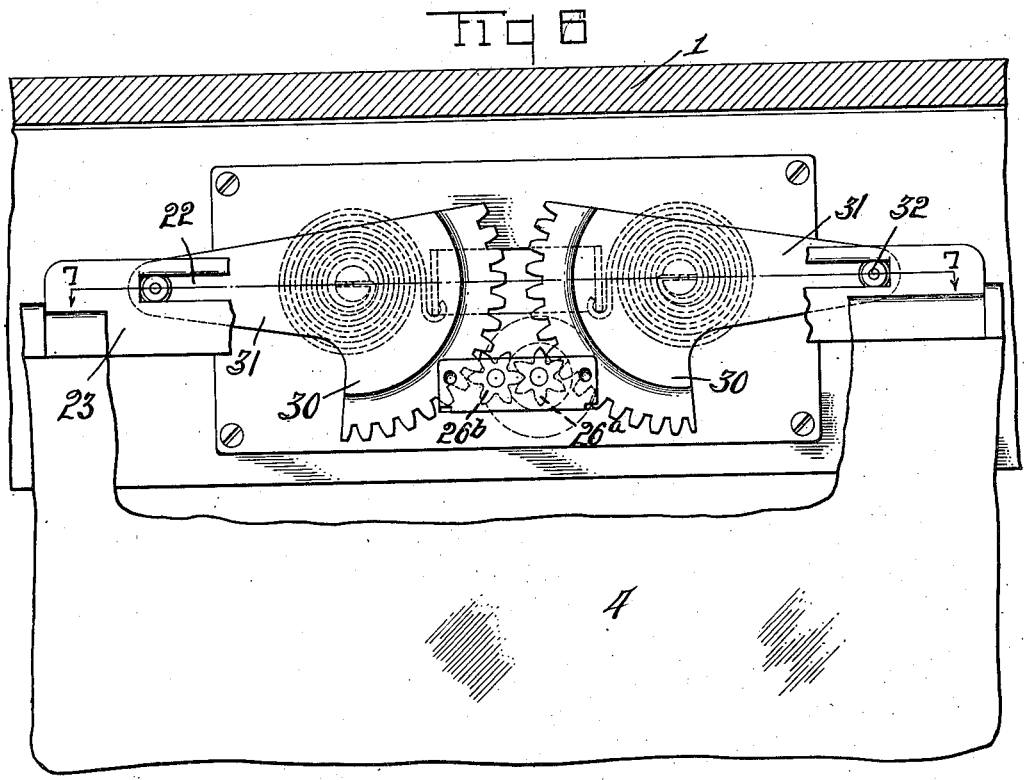
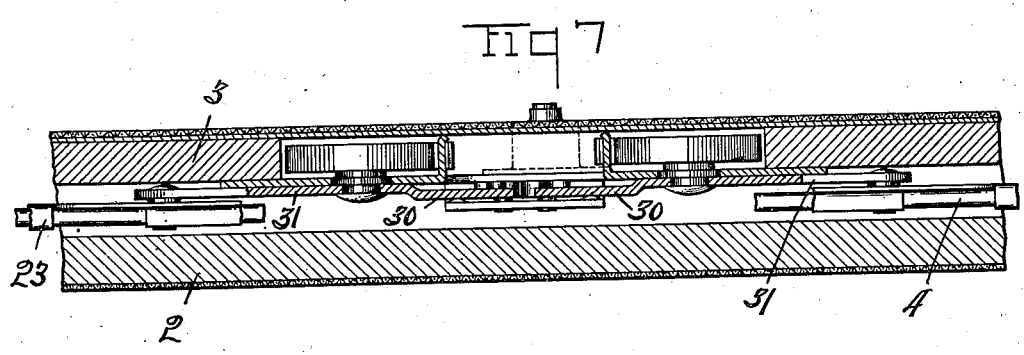
Inventor  
Angelo Robert Clas,  
By Owen Owen & Crampton  
Attorneys.

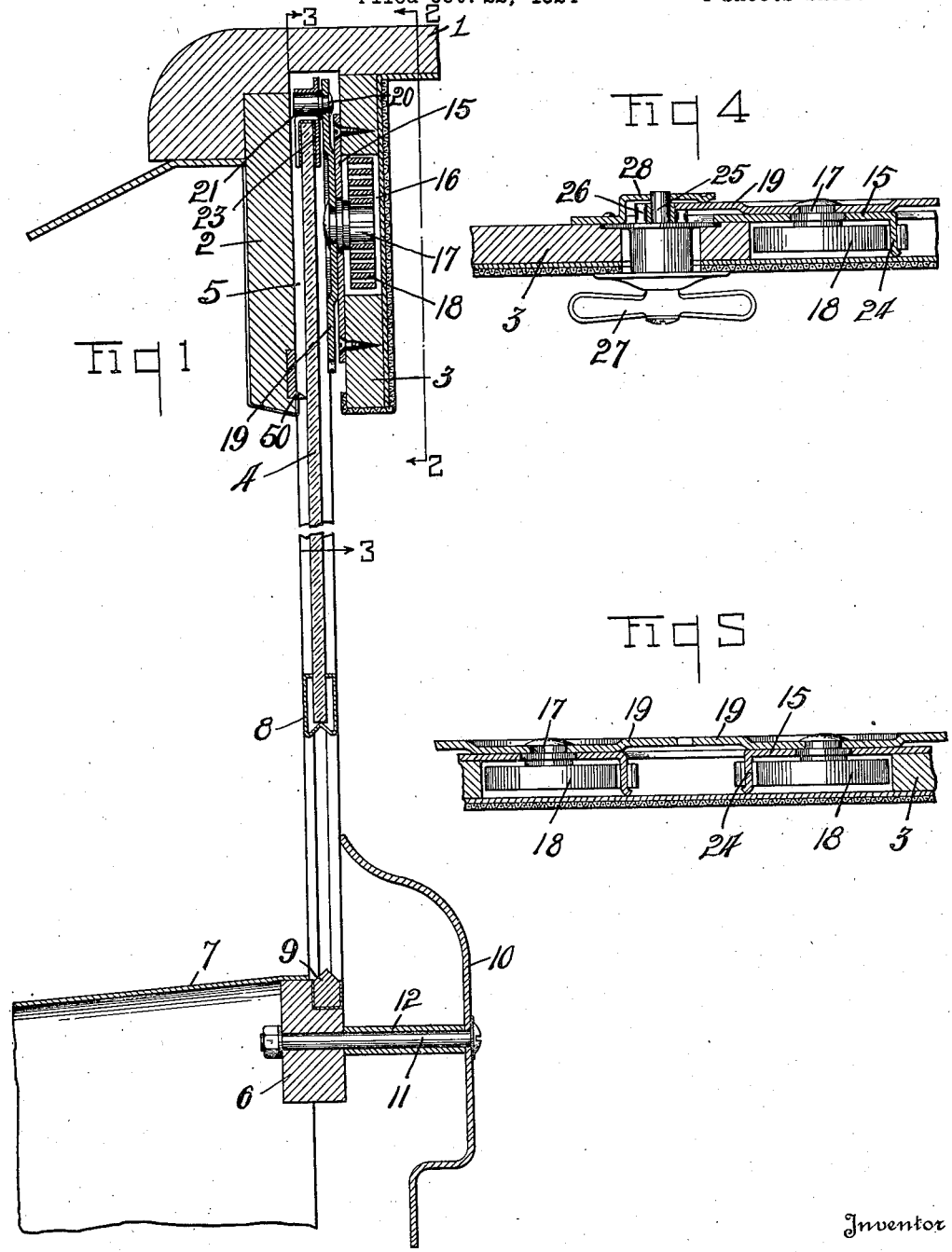

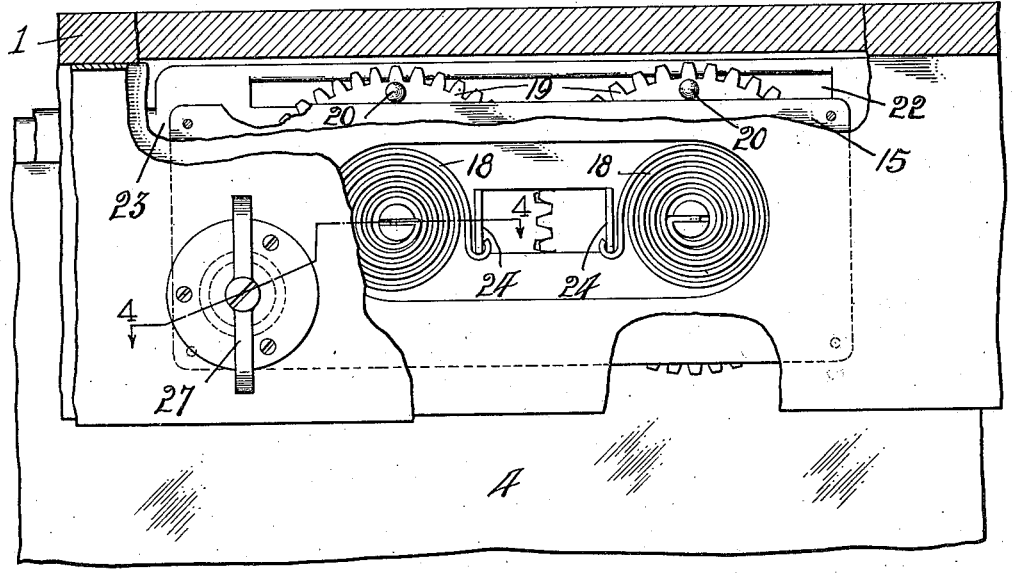
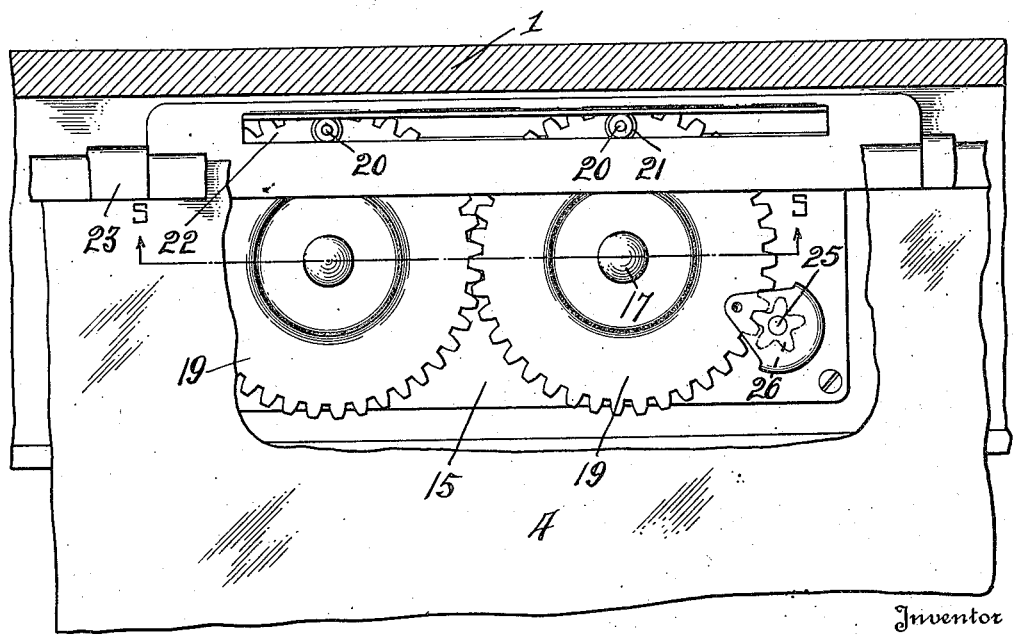

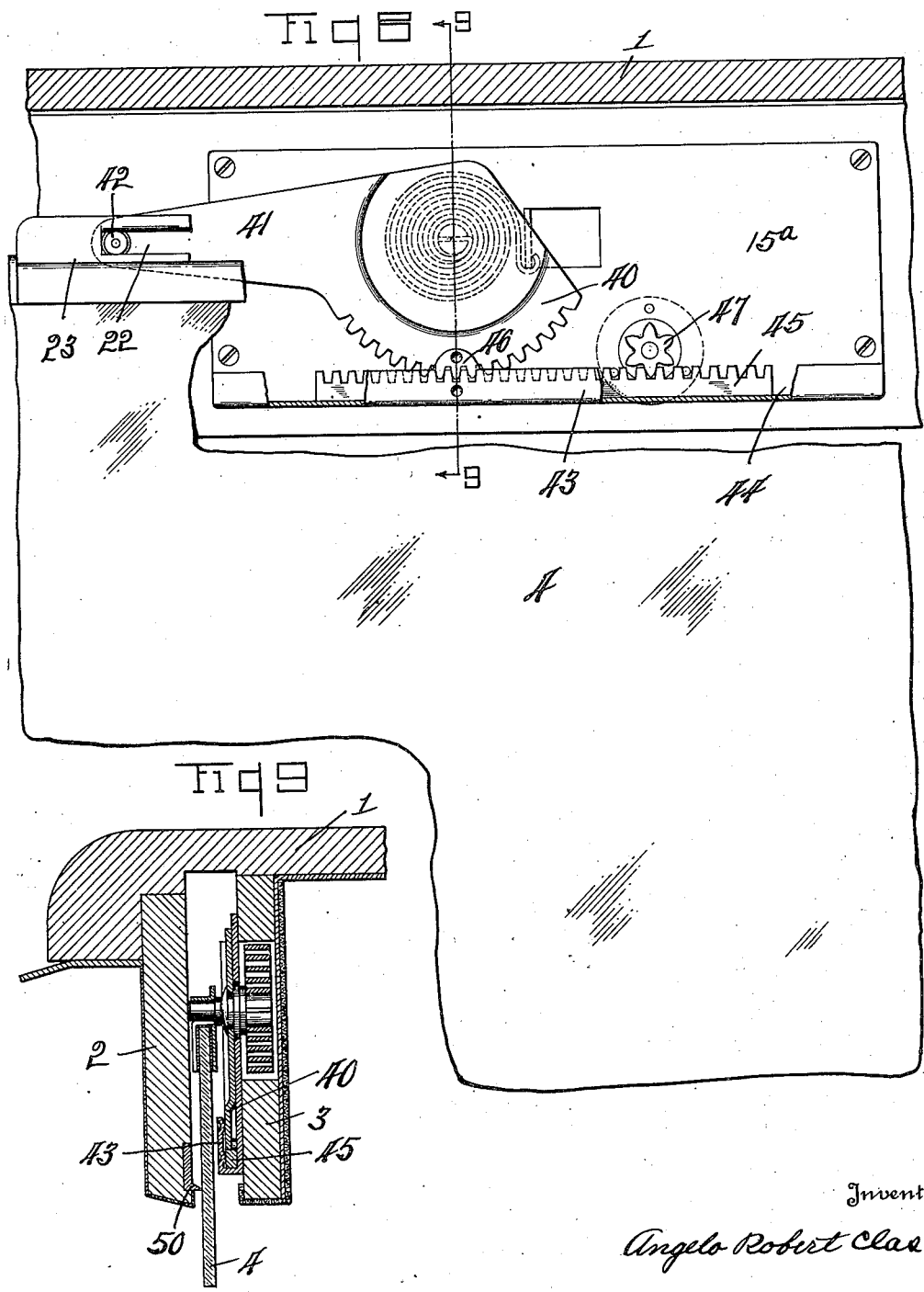

Patented Dec. 6, 1927.

1,651,870

UNITED STATES PATENT OFFICE.

ANGELO ROBERT CLAS, OF TOLEDO, OHIO, ASSIGNOR TO THE TOLEDO AUTOMOTIVE PRODUCTS COMPANY, A CORPORATION OF OHIO.

WINDOW-REGULATING MECHANISM.

Application filed October 22, 1924. Serial No. 745,169.

Objects of this invention are to provide a simple, efficient and compact window regulating mechanism; to provide a new and improved mechanism for raising and lowering windshields in order that the driver of the vehicle may readily and conveniently regulate the position thereof; and further to provide a window regulating mechanism having the new and improved features of construction and arrangement hereinafter described.

The primary object of the invention is the provision above the windshield of a simple, efficient and compact mechanism of the class described, which is easily accessible to the driver and suspends the windshield member from its top with its lower edge free from any supporting means. Further objects and advantages of the invention will be apparent from the following detailed description thereof.

While the invention in its broader aspect is capable of embodiment in numerous forms, a few forms only of the same are illustrated in the accompanying drawing, in which,—

Figure 1 is a fragmentary, vertical, longitudinal section of the portion of an automobile body with which the windshield is associated, together with the windshield mounted therein and in raised position and with the control mechanism therefor. Fig. 2 is a fragmentary cross-section on the line 2—2 in Fig. 1, with parts broken away. Fig. 3 is a similar section on the line 3—3 in Fig. 1, with parts broken away. Fig. 4 is a fragmentary section on the line 4—4 in Fig. 2. Fig. 5 is a fragmentary section on the horizontal portion of the line 4—4 and a continuation of the same. Fig. 6 is a view similar to Fig. 3, with a different form of window regulating mechanism in suspending connection with the windshield member. Fig. 7 is a horizontal section of the same on the line 7—7. Fig. 8 is a view similar to that of Fig. 6 with a different window suspending and regulating means associated therewith, and Fig. 9 is a vertical section thereof on the line 9—9 in Fig. 8.

Referring to the drawings, 1 designates an automobile top, and 2 and 3 cross frame members which depend from the front edge portion of the top and form the top portion of a frame or casing in which the windshield member or glass 4 is mounted for vertical sliding movements. The members 2 and 3 are separated to provide a space or pocket 5 therebetween for receiving the upper edge portion of the windshield member 4 and into which it may be raised a limited extent.

The lower edge of the windshield member 4, when lowered, seats on a bottom crossbar or sill-piece 6 of the frame in which the member is mounted, such cross-bar being disposed at the rear edge of the cowl 7. In order to provide a tight joint, the lower edge of the windshield member is provided with a binding strip 8 having an inverted V-groove at its bottom which seats down over a companion strip 9, preferably of rubber, on the cross bar 6.

A draft deflecting plate 10 is disposed at the rear of the cross-bar 6 in spaced relation thereto, and, in the present instance, is carried by bolts 11 projecting rearwardly from the bar 6 and on which bolts are spacing sleeves 12 to maintain the deflector in spaced relation to the bar. The upper edge of the plate 10 extends a distance above the plane of the bar 6 and inward to near the inner side of the windshield 4 when the latter is in lowered position. The lower edge of the plate 10 is directed to a point where it is desired to discharge air into the lower front portion of the vehicle.

The mechanism employed for controlling the raising and lowering movements of the windshield member 4 is carried by the top frame member 3 and is partially disposed within the space 5 in position to engage the upper edge of the windshield member and form a vertically movable suspending means therefor.

In the control mechanism, shown in Figs. 1 to 5, 15 designates a plate, preferably of sheet metal, which is secured to the inner side of the frame piece 3 and covers the inner side of an opening 16 provided in said frame piece. The plate 15 has two stub shafts 17 mounted in horizontally spaced relation therein for free turning movements and each having one end projecting into the opening 16 and carrying a helical counterbalancing spring 18, while the other end of the stub shaft projects into the space 5 and carries a gear 19. The two gears 19 are of thin form and disposed at the inner side of the windshield member 4 when raised within the space 5. The gears 19 are in meshing relation to cause them to turn in unison and each is provided near its edge with a wrist-pin 20 having a roller or sleeve 21 mounted for free turning movements thereon and projecting into a slot or runway 22 provided transversely of the windshield member 4 in a strip 23 secured to the upper edge thereof. The strip 23, in the present instance, is of U-form to adapt it to have straddling engagement with the edge of the windshield member and the portion of the strip in which the slot or opening 22 is provided is turned up from one side of the strip. The metal which is struck from the strip 23 to form the slot 22 is preferably turned forward from the upper edge of the slot to form a broadened bearing portion for resting on the supporting sleeves 21. It is evident that the wrist-pins 20 are positioned to maintain a constant horizontal alignment one with the other during a turning of the gears to effect a raising or lowering of the windshield member, and also that the windshield member is suspended at all times from such wrist pins except when seating at its lower edge on the sill strip 9.

The counter-balancing springs 18, one of which is mounted on each stub shaft 17, are fixedly secured at their inner ends to the respective shafts and are anchored at their outer ends by engagement with respecting inturned lips 24 on the plate 15. The tension of the springs on the stub shafts is such as to counterbalance the weight of the windshield member.

A shaft 25 is journalled in the frame member 3 and plate 15, in the present instance, near one end of said plate and carries a pinion 26 at its inner end in mesh with the adjacent gear 19. The opposite end of the shaft projects without the rear side of the member 3 and carries an operating or hand-engaging member 27 to facilitate a turning of the same from within the vehicle. This operating means is disposed within convenient reach of the driver. The portion of the plate 15, in which the shaft 25 is journaled, is inwardly offset from the plate, as shown at 28, to form a housing for the pinion 26 and to provide a tongue portion on such housing which laps the side of the adjacent gear 19 opposed to the body of the plate 15 and coacts with said gear to retain it in engagement with the pinion.

The raising and lowering mechanism shown in Figs. 6 and 7 is substantially the same as that above described, except that instead of the gears thereof, which are designated 30, being in mesh they are separated and of segmental form and each has an arm 31 projecting therefrom and provided with a transversely projected pin 32 and associated roller member which enter the slot 22 of the top edge strip 23 of the windshield member 4. The arms 31 project in opposite directions from the gears 30 and have their window raising and lowering movements in the outer arcs of movement of the gears as distinguished from the inner or adjacent arcs thereof. In this arrangement the drive pinion 26$^a$ is disposed between the two gears in mesh with one and connected to the other gear by an intermediate pinion 26$^b$.

In both forms of the invention above described, the windshield engaging or supporting members of the gears are continually in equi-distantly spaced relation to the center of gravity of the windshield member, so that the weight of such member is uniformly distributed to the two gears at all times.

In the form of the invention shown in Fig. 8 a single gear 40 is provided, which gear is of segmental form and has an arm 41 projecting therefrom and provided with a wrist-pin 42 and associated roller member which project within the slot 22 of the top edge strip 23 of the windshield member 4. The plate 15$^a$, which carries the stub shaft on which the gear 40 is mounted has its lower edge extending outward and upward beneath the gear 40, as shown at 43, to provide a horizontal raceway 44 for a rack-bar 45 in mesh with the gear 40. It is evident that longitudinal movements of the rack-bar within its raceway impart rocking movements to the gear 40 to effect the raising or lowering of the windshield member. A free edge of the up-turned portion 43 has a tongue 46 projecting upward therefrom at the side of the gear 40 opposed to the plate 15$^a$ and in engagement with the side of the gear to retain it in mesh with the rack bar. The drive pinion 47 of the hand-operating means, which is the same as that described in connection with the first form of the invention, is in mesh with the rack bar 45 to adapt it when turned to effect a movement of the bar.

A pliant or yielding weather strip 50 is secured to the lower inner edge of the frame member 2 in each case for rubbing contact with the outer side of the windshield member 4.

It is evident that I have provided a simple and efficient means located at the top of the windshield and easily operable to effect a raising or lowering of the windshield member, and that when the windshield member is raised the full extent or to a point above the upper edge of the deflecting strip 10 the air will enter the interior of the automobile above the strip 10 and will also be deflected into the lower front portion of the automobile by the strip 10. If the windshield member is not raised above the upper edge of the strip 10, all of the air will be deflected into the lower front portion of the automobile by the strip 10.

I wish it understood that my invention is not limited to any specific construction, arrangement of form of the parts, as it is capable of numerous changes and modifications without departing from the spirit of the claims.

Having thus described my invention, what I claim as new and desire to secure by Letters Patent is:

1. In a device of the class described, a vertically disposed frame including a pair of spaced supports extending transversely of the upper part of said frame, a window slidable in said frame and movable between said supports, a plate covering said opening, sheet metal gears in close juxtaposition to the outer surface of said plate, counterbalancing spring means for said gears disposed on the opposite side of said plate and in the plane of said support, a strip fixed to the upper end portion of said window having a longitudinally elongate opening, and a member fixed to said gears and projecting into said slot whereby rotation of said gears raises and lowers said window.

2. In a device of the class described, a vertically disposed frame including a pair of spaced supports extending transversely of the upper part of said frame, a window slidable in said frame and movable between said supports, sheet metal spur gears mounted in intermeshing relation and in close juxtaposition to the inside of one support, a strip fixed to the upper end portion of said window having a longitudinally elongate opening, a member fixed to each of said gears and projecting into said slot whereby rotation of said gears raises or lowers said window, counterbalancing spring means associated with said gears, a plate secured to the inside of one of said supports, and integral lugs on said plate constituting abutments for receiving one end of said counterbalancing spring means.

In testimony whereof I have hereunto signed my name to this specification.

ANGELO ROBERT CLAS.